US012636982B2

(12) United States Patent
Zhang et al.

(10) Patent No.: US 12,636,982 B2
(45) Date of Patent: May 26, 2026

(54) BASE ASSEMBLY AND CHILD SAFETY SEAT

(71) Applicant: Wonderland Switzerland AG, Steinhausen (CH)

(72) Inventors: Kun Zhang, Guangdong (CN); Xiaolong Mo, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 6 days.

(21) Appl. No.: 18/576,178

(22) PCT Filed: Oct. 17, 2022

(86) PCT No.: PCT/EP2022/078825
§ 371 (c)(1),
(2) Date: Jan. 3, 2024

(87) PCT Pub. No.: WO2023/062241
PCT Pub. Date: Apr. 20, 2023

(65) Prior Publication Data
US 2024/0326664 A1      Oct. 3, 2024

(30) Foreign Application Priority Data

Oct. 15, 2021      (CN) .......................... 202111203538.9

(51) Int. Cl.
B60N 2/28           (2006.01)
(52) U.S. Cl.
CPC .......... B60N 2/2824 (2013.01); B60N 2/2821 (2013.01); B60N 2/289 (2013.01); B60N 2/2893 (2013.01)

(58) Field of Classification Search
CPC .. B60N 2/2821; B60N 2/2824; B60N 2/2827; B60N 2/289; B60N 2/2893
See application file for complete search history.

(56) References Cited

U.S. PATENT DOCUMENTS

2003/0020308 A1*    1/2003   Pacella ................ B60N 2/2806
                                                              297/256.16
2006/0055218 A1     3/2006   Barker
(Continued)

FOREIGN PATENT DOCUMENTS

CN          201350854 Y     11/2009
CN          201989651 U     9/2011
(Continued)

OTHER PUBLICATIONS

Chinese Application No. 202320075022.9; Office Action dated May 6, 2023; 2 pages.
(Continued)

*Primary Examiner* — Syed A Islam
(74) *Attorney, Agent, or Firm* — CANTOR COLBURN LLP

(57)           ABSTRACT

The present disclosure discloses a base assembly including a base; a sliding element telescopically arranged on the base; a supporting leg which is pivotably connected to the sliding element and extended and retracted along with the sliding element, and which has an unfolded position when in use and a folded position when not in use; and a supporting leg retractable structure, which actuates the sliding element and the supporting leg to move toward inside of the base together in response to pivoting the supporting leg from the unfolded position to the folded position.

10 Claims, 15 Drawing Sheets

(56) References Cited

U.S. PATENT DOCUMENTS

| | | | |
|---|---|---|---|
| 2020/0346613 A1 | 11/2020 | Frank et al. |
| 2021/0078461 A1 | 3/2021 | Ma et al. |
| 2021/0146809 A1 | 5/2021 | Cui |
| 2025/0091487 A1 | 3/2025 | Mo |

FOREIGN PATENT DOCUMENTS

| | | | | | |
|---|---|---|---|---|---|
| CN | 102848946 | A | | 1/2013 |
| CN | 203237080 | U | | 10/2013 |
| CN | 203267824 | U | | 11/2013 |
| CN | 204687880 | U | | 10/2015 |
| CN | 106945576 | A | | 7/2017 |
| CN | 107791904 | A | | 3/2018 |
| CN | 109606215 | A | | 4/2019 |
| CN | 209938384 | U | | 1/2020 |
| CN | 110979114 | A | * | 4/2020 | ........... B60N 2/2824 |
| CN | 111251954 | A | | 6/2020 |
| CN | 111251955 | A | | 6/2020 |
| CN | 111251956 | A | | 6/2020 |
| CN | 111845485 | A | | 10/2020 |
| CN | 211731131 | U | | 10/2020 |
| CN | 211765092 | U | | 10/2020 |
| CN | 111923795 | A | | 11/2020 |
| CN | 113246821 | A | | 8/2021 |
| CN | 113352965 | A | | 9/2021 |
| CN | 215097163 | U | | 12/2021 |
| CN | 115675205 | A | | 2/2023 |
| DE | 202012101091 | U1 | | 5/2012 |
| DE | 202013103194 | U1 | | 10/2013 |
| DE | 202013103189 | U1 | | 11/2013 |
| DE | 102017115291 | A1 | | 1/2018 |
| EP | 0485121 | A1 | | 5/1992 |
| JP | S49078203 | U | | 7/1974 |
| JP | S49105401 | U | | 9/1974 |
| JP | S57045335 | U | | 3/1982 |
| JP | H08126527 | A | | 5/1996 |
| JP | 2001239868 | A | | 9/2001 |
| JP | 2002193001 | A | | 7/2002 |
| JP | 2007246061 | A | | 9/2007 |
| TW | 255866 | B | | 9/1995 |
| TW | 202126510 | A | | 7/2021 |
| WO | 02051347 | A1 | | 7/2002 |
| WO | 2019019502 | A1 | | 1/2019 |
| WO | 2021122901 | A1 | | 6/2021 |
| WO | 2022084180 | A1 | | 4/2022 |
| WO | 2022268804 | A1 | | 12/2022 |
| WO | 2023131701 | A1 | | 7/2023 |

OTHER PUBLICATIONS

International Search Report for International Application No. PCT/EP2022/070862; International Filing Date: Jul. 26, 2022; Date of Mailing: Dec. 5, 2022; 3 pages.

International Search Report for International Application No. PCT/EP2022/078825; International Filing Date: Oct. 17, 2022; Date of Mailing: Feb. 16, 2023; 3 pages.

International Search Report for International Application No. PCT/EP2023/050293; International Filing Date: Jan. 9, 2023; Date of Mailing: Mar. 24, 2023; 5 pages.

Taiwanese Application No. 111127923; Office Action dated May 24, 2023; 6 pages.

Taiwanese Application No. 111139132; Office Action dated Jun. 27, 2023; 6 pages.

Taiwanese Application No. 112100768; Office Action dated Dec. 1, 2023; 9 pages.

Written Opinion for International Application No. PCT/EP2022/070862; International Filing Date: Jul. 26, 2022; Date of Mailing: Dec. 5, 2022; 4 pages.

Written Opinion for International Application No. PCT/EP2022/078825; International Filing Date: Oct. 17, 2022; Date of Mailing: Feb. 16, 2023; 4 pages.

Written Opinion for International Application No. PCT/EP2023/050293; International Filing Date: Jan. 9, 2023; Date of Mailing: Mar. 24, 2023; 6 pages.

JP 1st Office Action w English Translation; Application No. 2024-521309; Date Mailed: May 7, 2025; pp. 1-8.

JP Search Report w English Translation; Application No. 2024-521309; Date Mailed: Apr. 22, 2025; pp. 1-18.

Canadian Appl No. 3221798; Office Action dated Mar. 21, 2025; pp. 1-4.

Taiwanese Application No. 113135990; Notice of Allowance w English Translation dated Jan. 23, 2025; pp. 1-14.

Chinese Application No. CN2021112035389; Office Action with English dated Mar. 15, 2025; 14 pages.

Japanese Application No. 2024-502705; Reasons for Refusal with English dated Mar. 17, 2024; 5 pages.

Japanese Application No. 2024-502705; Search Report dated Mar. 18, 2024; 34 pages.

Taiwanese Application No. 113145473; Office Action with English translation dated Feb. 7, 2024; 9 pages.

Taiwanese Application No. 112148932; Office Action dated Mar. 26, 2024; 9 pages.

JP 1st Office Action with English Translation; Appl No. 2024-541108; Date Mailed:Sep. 2, 2025; pp. 1-13.

CN 1st Office Action with English Translation; App No. 202110844522.X; Date Mailed: Jan. 23, 2026; pp. 1-15.

CN Notice of Allowance with English Translation; Appl No. 202210873961.8; Date Mailing: Apr. 15, 2026; pp. 1-8.

* cited by examiner

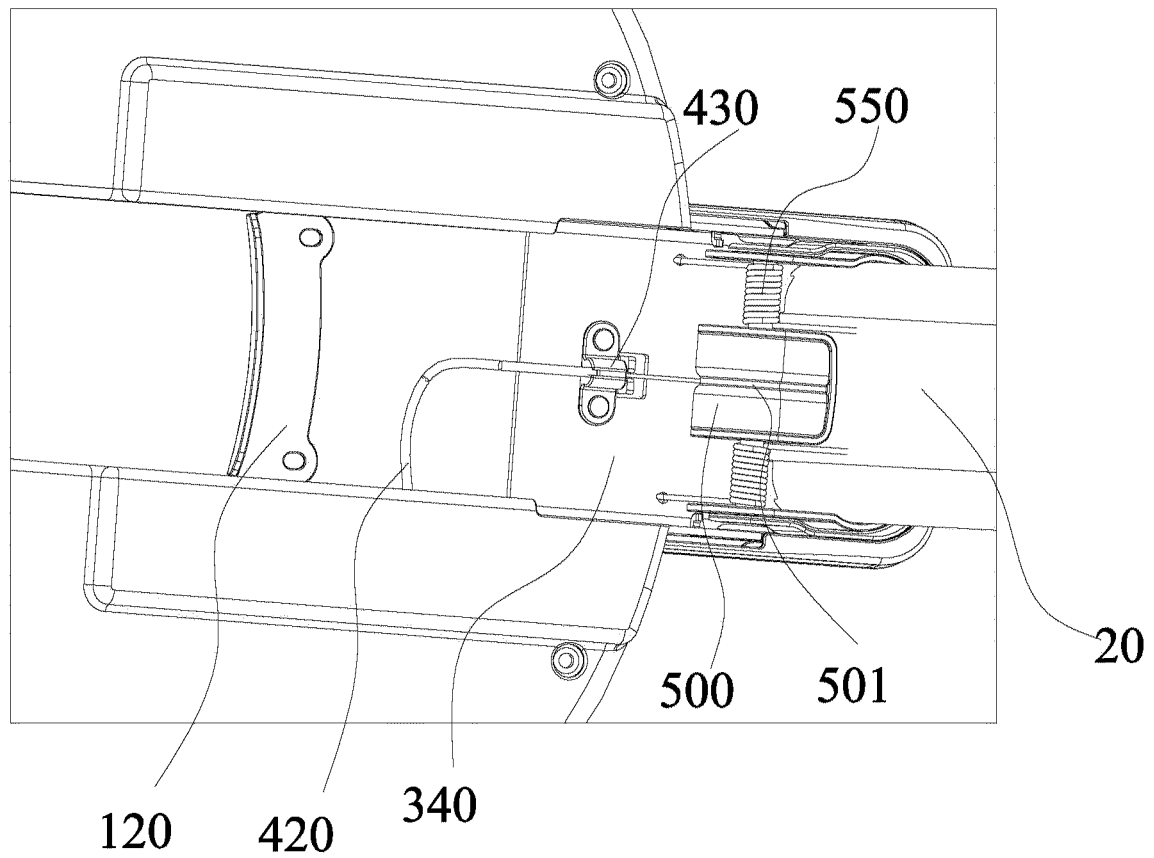
Fig. 4A

BASE ASSEMBLY AND CHILD SAFETY SEAT

This application is a National Stage application of PCT/EP2022/078825, filed on Oct. 17, 2022, which claims the benefit of Chinese Application No. 202111203538.9, filed on Oct. 15, 2021, both of which are incorporated herein by reference in their entirety.

TECHNICAL FIELD

The present disclosure relates to the technical field of child safety seats, in particular to a base assembly and a child safety seat that are convenient to operate.

BACKGROUND

Child safety seats have become indispensable carriers for children to travel. In order to improve the stability and use safety of the child safety seat, a supporting leg structure will be installed on the base. When in use, the supporting leg structure is unfolded and grounded, which can well support the child safety seat to prevent the child safety seat from being overturned; and when not in use, the supporting leg structure may be folded at a bottom of the base to reduce the volume of the child safety seat.

However, the child safety seat that is provided with the supporting leg structure has a projection at a front end of the base thereof, which projection is configured to install and pivot the supporting leg structure. When the supporting leg is not needed, the projection may be a hindrance, which may not only affect the riding experience of children, but also increase the volume of the child safety seat, increasing the transportation cost.

Although a child safety seat with a retractable supporting leg structure may solve the above problems, it needs two steps to be folded and retracted, and it is necessary to fold the supporting leg structure, and then push the supporting leg structure to retract the supporting leg structure, so as to achieve the purpose of complete folding. In this way, it has a complicated operation and a poor user experience.

SUMMARY

The present disclosure provides a base assembly. The base assembly includes a base; a sliding element which is telescopically arranged on the base, a supporting leg which is pivotally connected to the sliding element and extended and retracted together with the sliding element, and which has an unfolded position when in use and a folded position when not in use; and a supporting leg retractable structure, which actuates the sliding element and the supporting leg to move toward inside of the base together in response to pivoting the supporting leg from the unfolded position to the folded position.

In another aspect, a child safety seat is provided. The child safety seat includes a base assembly and a seat arranged on the base assembly, wherein the base assembly is the above-mentioned base assembly.

BRIEF DESCRIPTION OF THE DRAWINGS

By considering the following detailed description of the preferred embodiments of the disclosure in conjunction with the accompanying drawings, various objectives, features and advantages of the disclosure will become more apparent. The drawings are merely exemplary illustrations of the disclosure and are not necessarily drawn to scale. In the drawings, the same reference numerals always refer to the same or similar parts, in which:

FIG. 4A is a partial view of FIG. 4;

LIST OF REFERENCE NUMBERS

Figure 1:
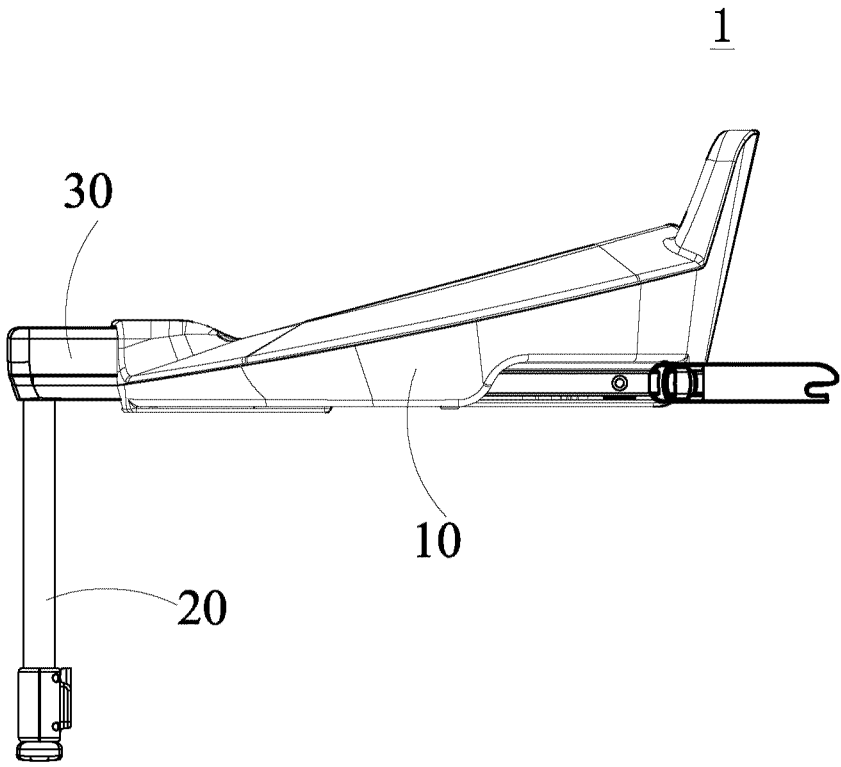
FIG. 1 is a side view of a base assembly of the present disclosure, in which a supporting leg of the base assembly is in an unfolded position.

Base Assembly 1
Base 10
Fixing Frame 120
Base Bracket 160
Sliding Rod 161
Receiving Groove 170
Locking Element 180

Supporting Leg 20
Connector 240
Protective Cover 250
Sliding Element 30
Sliding Bracket 340
Sliding Groove 341
Housing 350
Traction Element 40
Wire 410
Jacket 420
Limiting Boss 430
Driving Element 500
Traction Element Limiting Groove 501
Traction Element Connecting Part 502
Rotatable Linkage Assembly 510
Pivot Shaft 511
Connecting Column 512
Rotatable Linkage 513
Connecting Lug 514
Gear Assembly 520
Traction Rack 521
Transmission Gear 522
Traction Rod Assembly 530
Traction Rod 531
First Rotating Shaft 5311
Second Rotating Shaft 5312
Mounting Lug 532
Avoidance Groove 533
First Rotating Hole 534
Second Rotating Hole 535
First Restoring Element 540
Second Restoring Element 550

DETAILED DESCRIPTION

In order to explain the whole concept of the present disclosure more clearly, the following detailed description will be made by way of example with reference to the attached drawings of the specification.

It should be noted that in the following description, many specific details are set forth in order to fully understand the present disclosure. However, the present disclosure can be implemented in other ways different from those described here. Therefore, the protection scope of the present disclosure is not limited by the specific embodiments disclosed below.

In addition, in the description of the present disclosure, it should be understood that the terms "center", "up", "down", "front", "back", "left", "right", "vertical", "horizontal", "top", "bottom", "inside", "outside", "axial", "radial", "circumferential", etc. indicate the orientation or positional relationship based on the orientation or positional relationship shown in the drawings, which are only for the convenience of describing the present disclosure and simplifying the description, rather than indicating or implying that the indicated device or component must have a specific orientation, or must be constructed and operated in a specific orientation, and therefore should not be construed as a limitation on the present disclosure.

In the present disclosure, unless otherwise specified and limited, the terms "installed", "connected", "coupled" and "fixed" should be understood broadly, for example, may be fixed, detachable or integrated; or may be directly connected or indirectly connected through an intermediate medium, and may be in an internal communication of two components or an interaction between two components. However, direct connection means that two connected subjects do not build a connection relationship through excessive structure, but only form an integrated part through a connection structure. For those of ordinary skill in the art, the specific meanings of the above terms in the present disclosure can be understood according to specific situations.

In the present disclosure, unless otherwise specified and limited, a first feature "on" or "under" a second feature may be in direct contact between the first and second features, or in indirect contact between the first and second features through an intermediate medium. In the description of this specification, the description referring to the terms "an embodiment", "some embodiments", "example", "specific example" or "some examples" means that the specific features, structures, materials or characteristics described in connection with the embodiment or example are included in at least one embodiment or example of the present disclosure. In this specification, the schematic expressions of the above terms do not necessarily refer to the same embodiment or example. Furthermore, the specific features, structures, materials or characteristics described may be combined in any one or more embodiments or examples in a suitable manner.

The present disclosure provides a child safety seat, which may be installed on a vehicle seat for babies or children to ride, and ensures the safety of occupants.

Figure 2:
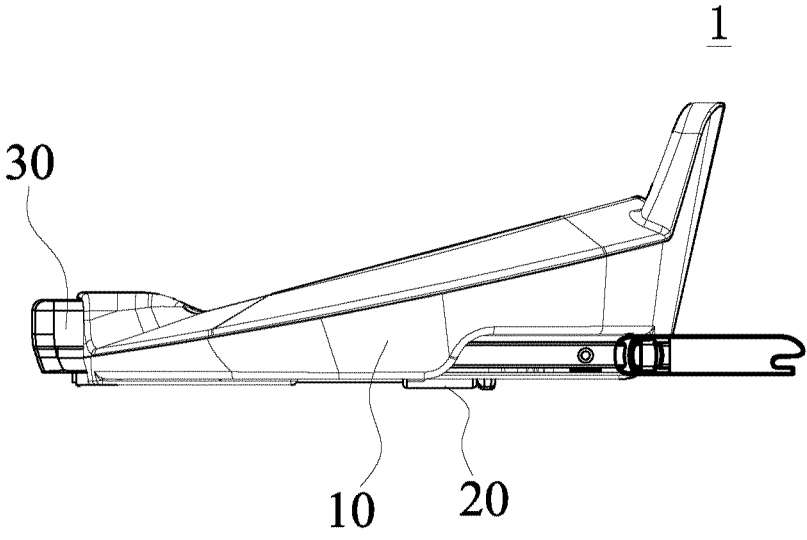
FIG. 2 is a side view of the base assembly of the present disclosure, in which the supporting leg of the base assembly is in a folded position.

As shown in FIGS. 1 and 2, the child safety seat includes a base assembly 1 and a seat (not shown). The base assembly 1 includes a base 10 and a supporting leg 20. The seat is rotatably arranged on the base 10 and has at least a forward position and a backward position. The forward position may be a position that the seat faces toward the front of the vehicle, and the backward position may be a position that the seat faces toward the rear of the vehicle. For example, the forward position is suitable for older children, and the backward position is suitable for younger children, however, this application is not limited thereto.

The supporting leg 20 is rotatably and telescopically connected to the base 10. When the supporting leg 20 is used, the supporting leg 20 may be extended out of the base 10 and rotated to be grounded (as shown in FIG. 1), so that the child safety seat can be prevented from being overturned during the impact. When the supporting leg 20 is not needed, the supporting leg 20 may be rotated synchronously and retracted into the base 10 (as shown in FIG. 2), so that the overall size of the child safety seat can be reduced, and it is convenient to be stored and use.

A first embodiment of the present disclosure will be described below mainly with reference to FIGS. 3-6.

The base assembly 1 may include a base 10; a sliding element 30 telescopically arranged on the base 10; a supporting leg 20, pivotably connected to the sliding element 30 and extended and retracted along with the sliding element 30, the supporting leg 20 having an unfolded position when in use (as shown in FIG. 1) and a folded position when not in use (as shown in FIG. 2); and a supporting leg retractable structure actuating the sliding element 30 and the supporting leg 20 to move toward inside of the base 10 together in response to pivoting the supporting leg 20 from the unfolded position to the folded position.

In this embodiment, the supporting leg retractable structure includes a driving element 500 and a guide assembly (which will be described in detail below).

The base 10 includes a base bracket 160. The base 10 may be provided with a fixing frame 120. The fixing frame 120 and the base bracket 160 may be used as carriers. The base 160 may have a frame structure, and may be formed as two parallel and symmetrical tubular elements extending in a front-back direction of the base 10. The fixing frame 120 may connect with two tubular elements of the base bracket 160.

The sliding element 30 includes a sliding bracket 340. The sliding bracket 340 may be sleeved on the base bracket 160 and may slide a certain distance with respect to the base bracket 160. In other words, the sliding bracket 340 may also form two parallel parts corresponding to those of the base bracket 160. As clearly shown in FIG. 11 (although it is explained with reference to FIG. 11, it can be understood that the structure shown in FIG. 11 may be applied to other embodiments), the base bracket 160 may include a sliding rod 161, and the sliding bracket 340 may include a sliding groove 341. The sliding groove 341 is formed in an elongated shape to allow the sliding rod 161 to move a certain distance therein.

Figure 4:
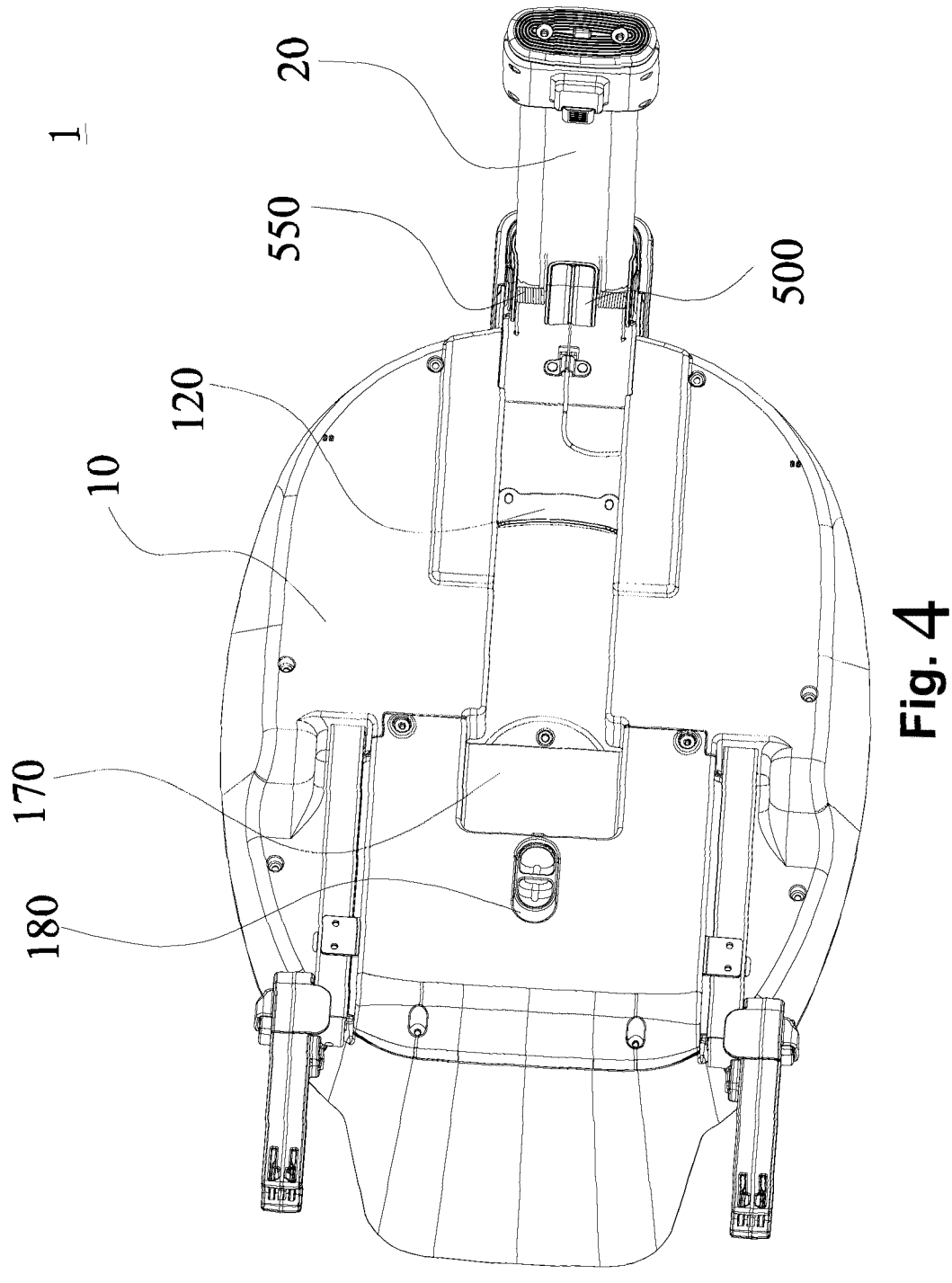
FIG. 4 is a perspective view of the base assembly according to the first embodiment of the present disclosure, in which the supporting leg of the base assembly is in the unfolded position.
Figure 5:
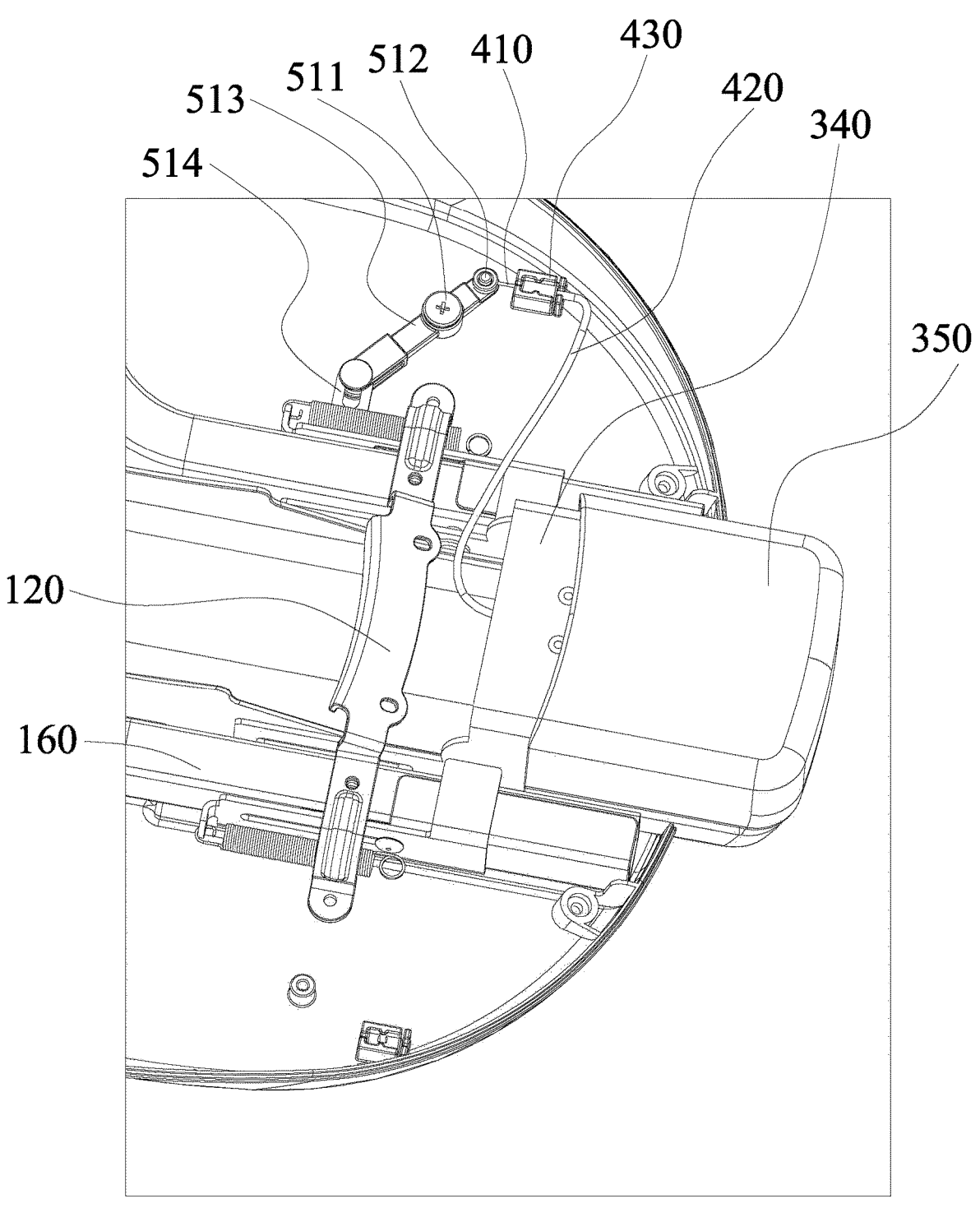
FIG. 5 is a partial perspective view of the base assembly according to the first embodiment of the present disclosure, in which the supporting leg of the base assembly is in the folded position.
Figure 6:
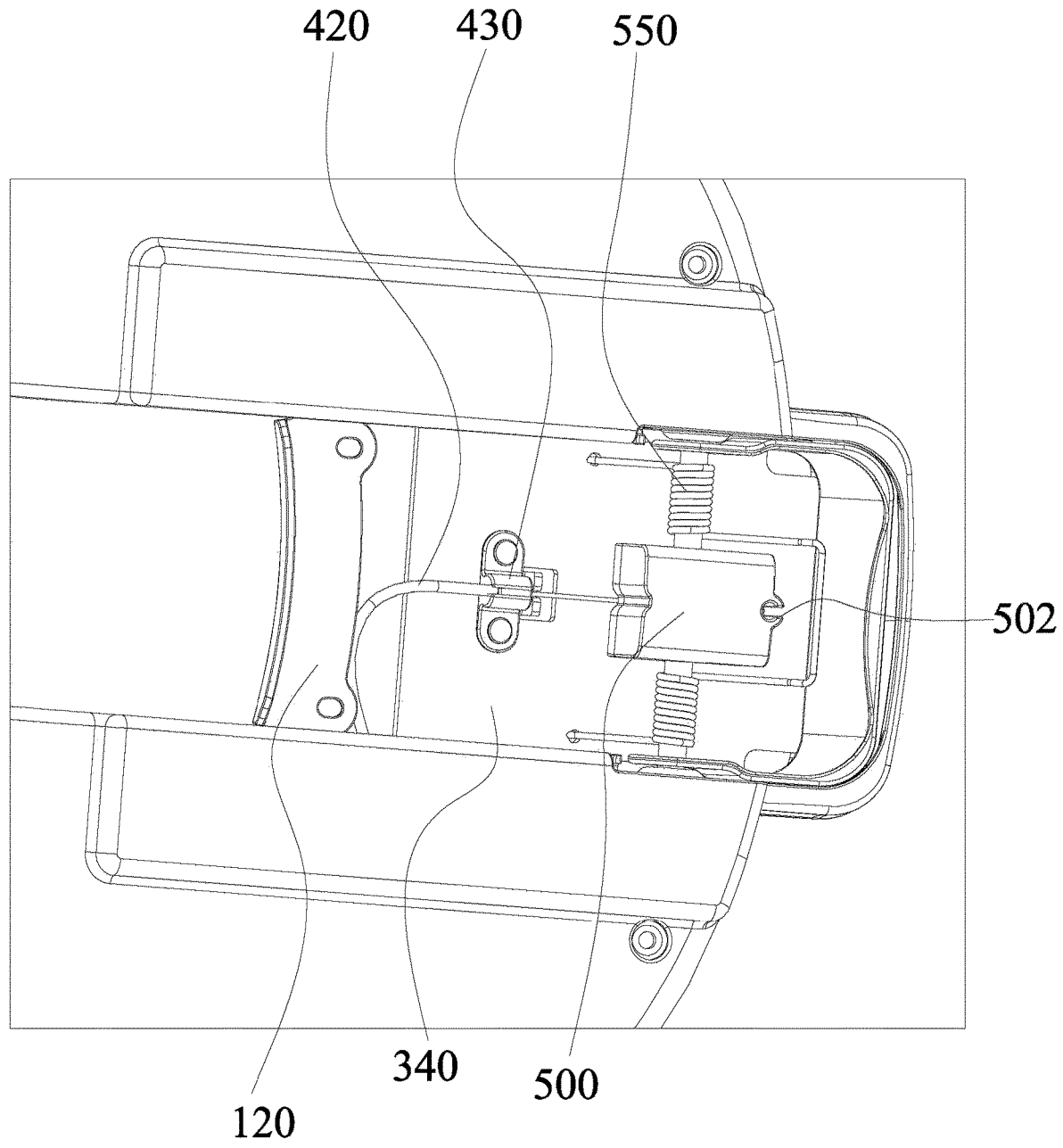
FIG. 6 is a partial perspective view of the base assembly according to the first embodiment of the present disclosure, in which the supporting leg of the base assembly is in the folded position.

Referring to FIG. 4, the base 10 further includes a receiving groove 170. When the supporting leg 20 is folded, it may be received within the receiving groove 170, so that the supporting leg 20 in the folded position does not protrude out of a bottom surface of the base 10, or slightly protrudes out of the bottom surface of the base 10. The base 10 may also include a locking element 180. The locking element 180 may be in a form of a push button, which is movably arranged on the bottom surface of the base 10, and may be engaged with and lock one end of the supporting leg 20 that is folded in the receiving groove 170. The locking element 180 may prevent the supporting leg 20 from being accidentally rotated out of the unfolded position.

The sliding element 30 further includes a housing 350 connected with the sliding bracket 340. The housing 350 may be connected and fixed with the sliding bracket 340 by rivets, for example.

Figure 8:
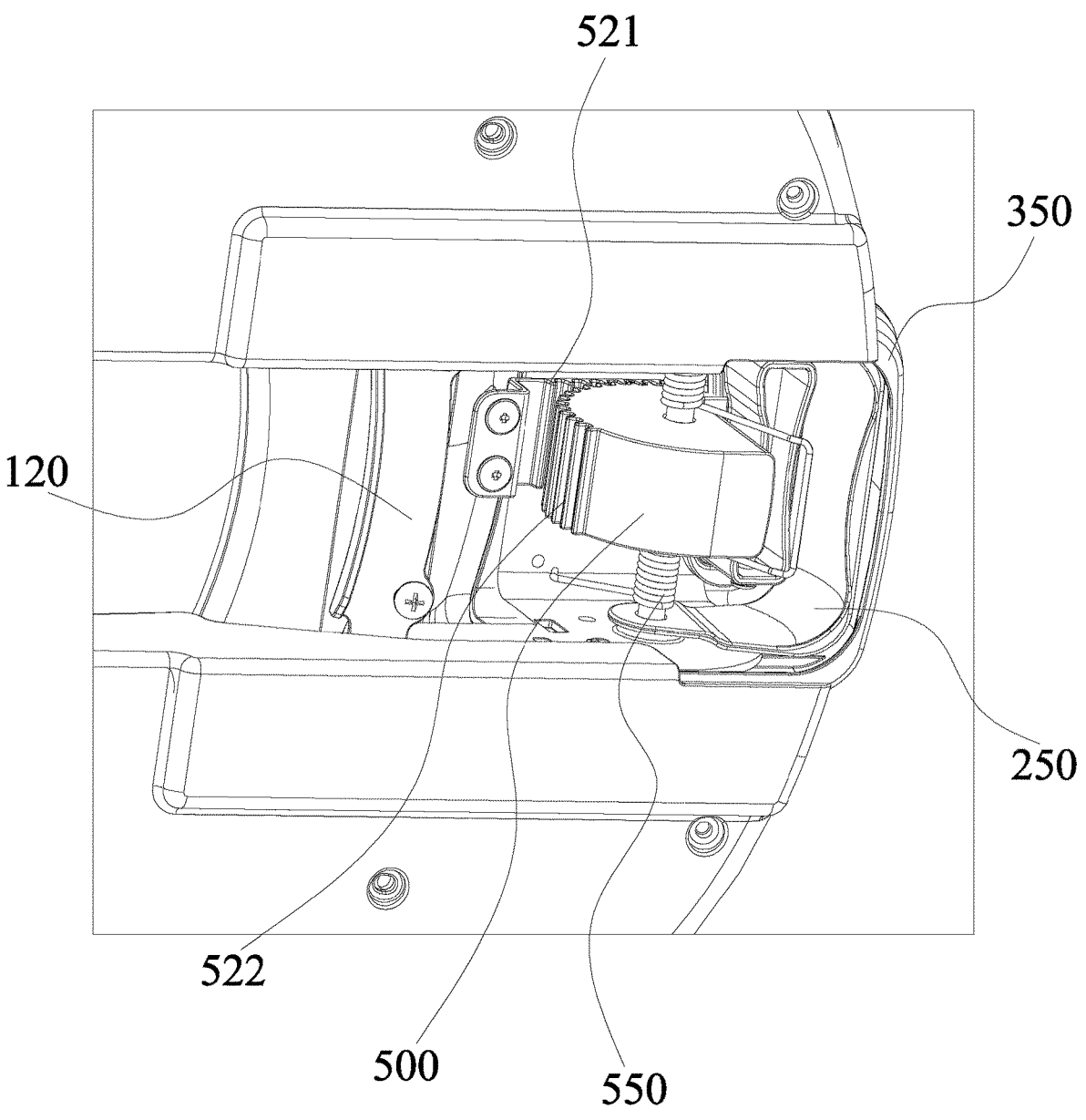
FIG. 8 is a partial perspective view of the base assembly according to the second embodiment of the present disclosure, in which the supporting leg of the base assembly is in a folded position.
Figure 9:
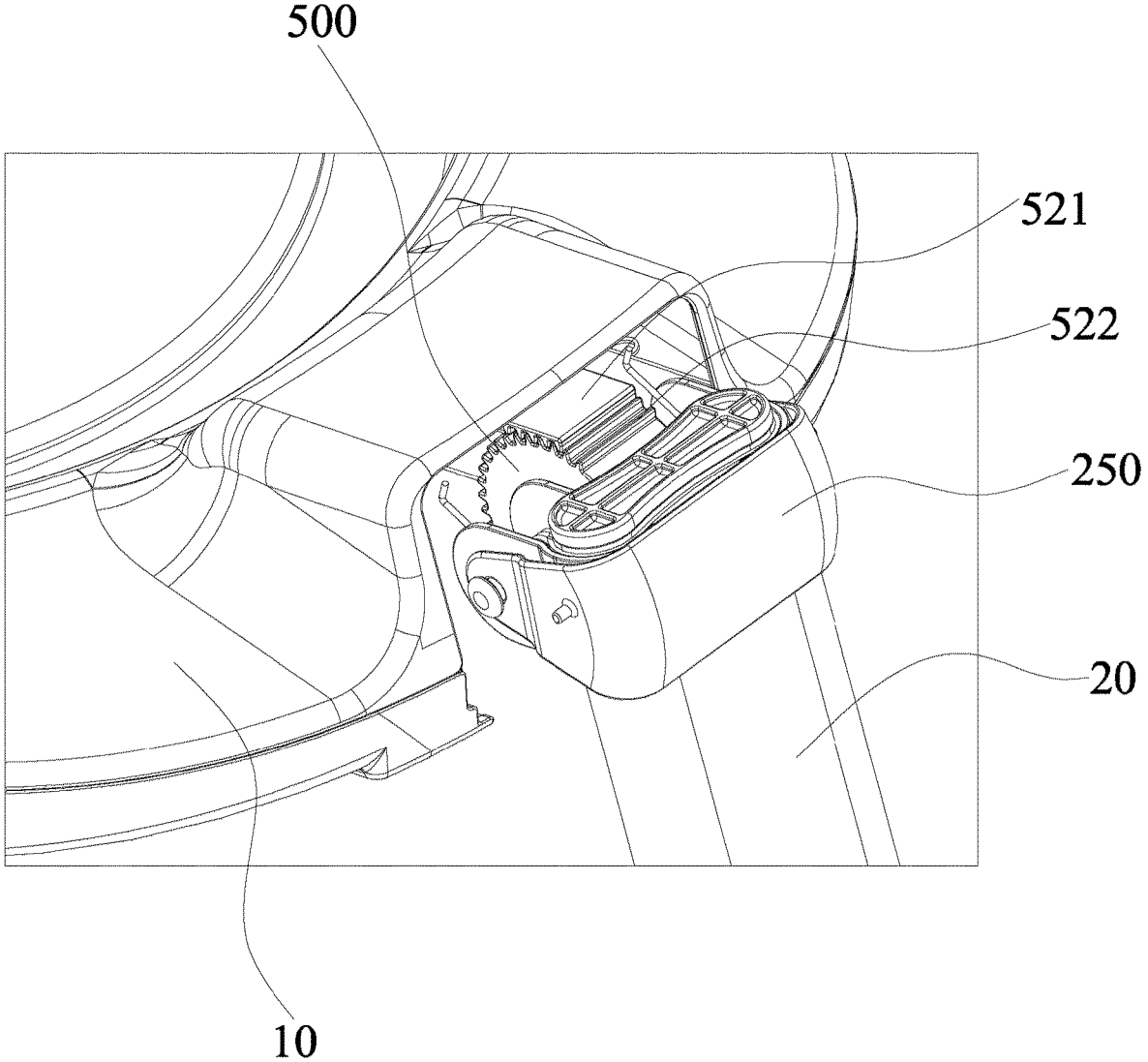
FIG. 9 is a partial perspective view of the base assembly according to the second embodiment of the present disclosure, in which the supporting leg of the base assembly is in the unfolded position.

A protective cover 250 may be provided in the housing 350 (referring to FIGS. 8 and 9). A pivot shaft may pass through the sliding bracket 340, the protective cover 250, the driving element 500 and the supporting leg 20. That is, the protective cover 250 may be provided coaxially with the driving element 500. The protective cover 250 may be pivoted with the supporting leg 20 to shield a gap between the supporting leg 20 and the housing 350 of the sliding element 30 when the supporting leg 20 is pivoted to the folded position, so as to prevent from injury.

The base assembly 1 further includes a first restoring element 540 and a second restoring element 550. The first restoring element 540 may be formed as a tension spring, and the second restoring element 550 may be formed as a torsion spring, however, this application is not limited thereto. The first restoring element 540 may be used to move the sliding element 30 toward outside of the base 10.

The first restoring element 540 may be formed as two tension springs, both of which connect the sliding bracket 340 and the base bracket 160 to exert a tensile force. When the sliding element 30 is retracted from a position protruding to the front of the base 10 to the inside of the base 10 (the sliding element 30 is at least partially located inside the base 10), the first restoring element 540 stores energy, and when the locking element 180 releases the supporting leg 20 in the folded position, the first restoring element 540 releases the stored energy to provide a tensile force and work to move the sliding element 30 to the position protruding to the front of the base 10.

Two ends of the second restoring element 550 may act on the supporting leg 20 and the sliding element 30 respectively. When the supporting leg 20 is pivoted from the unfolded position to the folded position, the second restoring element 550 stores energy, and when the locking element

180 releases the supporting leg 20 in the folded position, the second restoring element 550 releases the stored energy to provide a torsional force and work to pivot the supporting leg 20 to the unfolded position.

Figure 3:
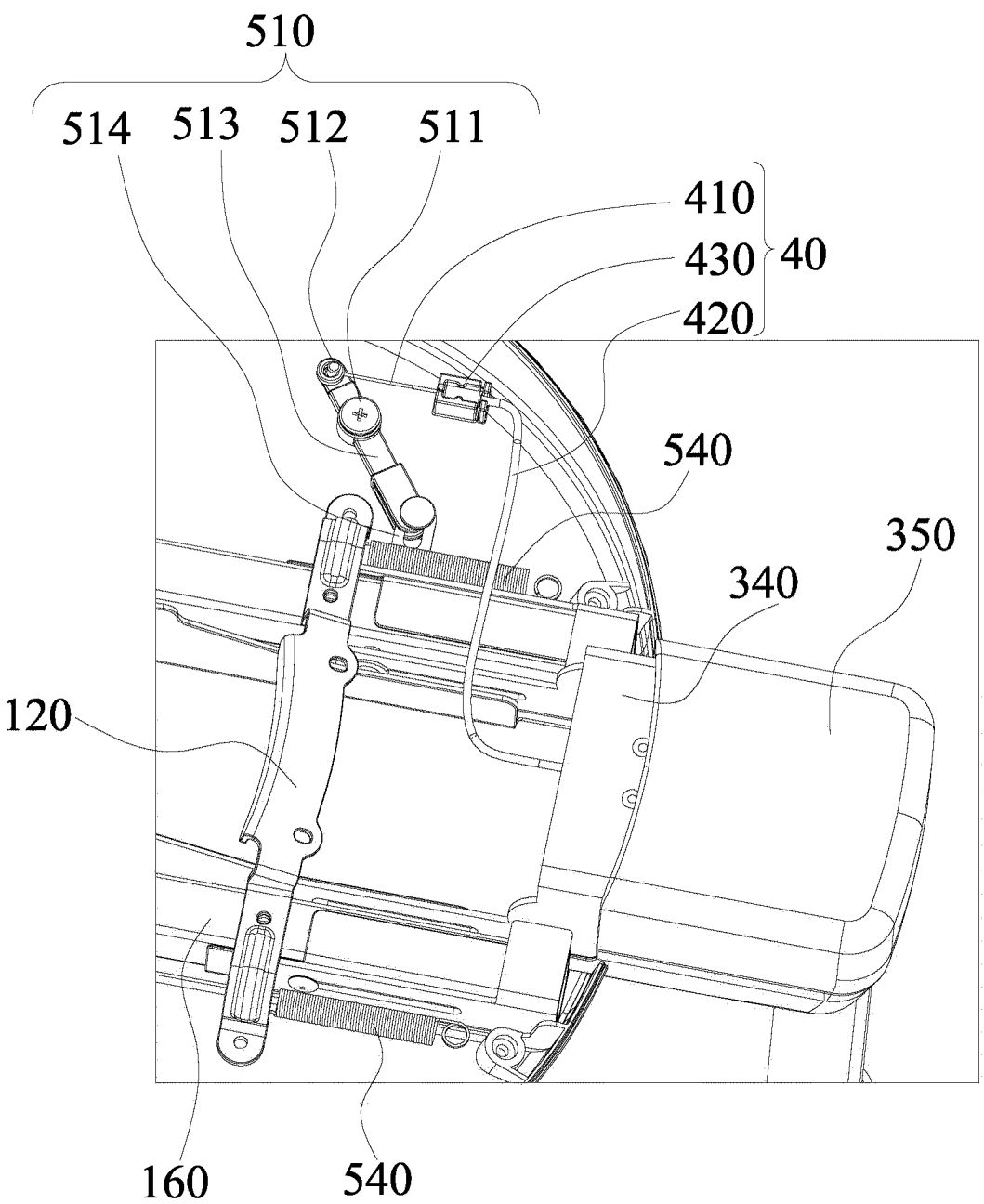
FIG. 3 is a partial perspective view of the base assembly according to a first embodiment of the present disclosure, in which the supporting leg of the base assembly is in the unfolded position.

The driving element 500 may be arranged inside the sliding element 30 and may be pivoted together with the supporting leg 20. As shown in FIG. 3, the guide assembly may include a traction element 40 and a rotatable linkage assembly 510, which are used to convert the pivoting of the driving element 500 into an actuating force to move the sliding element 30 and the supporting leg 20 together toward the inside of the base 10.

As shown in FIGS. 3 to 4A, the traction element 40 may include a wire 410, a jacket 420 and a limiting boss 430. The traction element 40 may transfer the movement of one end of the traction element 40 to the other end of the traction element 40. Two limiting bosses 430 may be respectively provided on the base 10 and the sliding element 30 to fix both ends of the jacket 420. The jacket 420 may be flexible to change its shape along with the movement of the sliding element 30 with respect to the base 10. The wire 410 may be, for example, a steel wire, which is arranged in the jacket 420 and extends out of both ends of the jacket 420. One end of the wire 410 (as shown in FIG. 4A) may be connected to a traction element connecting part 502 of the driving element 500 (for example, a front end of the driving element 500).

An outer circumferential surface of the driving element 500 may be at least partially formed into an arc shape. The driving element 500 may be formed with a traction element limiting groove 501. A part of the wire 410 may be positioned in the traction element limiting groove 501 to prevent the wire 410 from swinging left and right when moving.

The rotatable linkage assembly 510 may include a pivot shaft 511, a connecting column 512, a rotatable linkage 513 and a connecting lug 514. The rotatable linkage 513 is pivotably connected to the base 10 via the pivot shaft 511. The other end of the wire 410 (as shown in FIG. 3) may be connected to one end of the rotatable linkage 513, that is, connected to the connecting column 512. The connecting lug 514 may be fixed on the sliding bracket 340. The other end of the rotatable linkage 513 may be connected to the connecting lug 514. The connecting lug 514 may be formed with an elongated hole, and the other end of the rotatable linkage 513 may be connected into the elongated hole, so that an arc motion of the other end of the rotatable linkage 513 is converted into a linear motion of the sliding bracket 340 along the base bracket 160. It can be understood that because of the existence of the rotatable linkage 513, setting a length of the rotatable linkage 513 of any side of the pivot shaft 511 may realize the effect of enlarging or shortening a moving distance of the wire 410 and transferring the moving distance to the sliding bracket 340.

In other embodiments, it may also be realized in other ways that the pivoting of the supporting leg 20 at a smaller angle causes the sliding element 30 and the supporting leg 20 to move a larger distance together. For example, the rotatable linkage assembly 510 may be replaced by a pulley block or other mechanisms.

During the pivoting of the supporting leg 20 from the unfolded position to the folded position, the pivoting of supporting leg 20 drives one end of the wire 410 to move around the driving element 500 (the driving element 500 is pivoted along with the supporting leg 20), and this movement is transmitted to the other end of the wire 410, thereby pulling the connecting column 512 of the rotatable linkage assembly 510, and then causing the rotatable linkage assembly 510 to be pivoted around the pivot shaft 511, and finally, the other end of the rotatable linkage assembly 510 pulls the sliding bracket 340 via the connecting lug 514, so that the sliding element 30 and the supporting leg 20 move toward the inside of the base 10 together.

It can be understood that, during the pivoting of the supporting leg 20 from the folded position to the unfolded position, the above-mentioned processes happen reversely.

As described above, it can be seen that the base assembly 1 of this embodiment can realize a folding process by only one step of pivoting the supporting leg 20, and the operation is simple. At the same time, a magnitude of force to be applied and a distance with which the sliding element 30 moves can be changed as required.

A second embodiment of the present disclosure will be described below mainly with reference to FIGS. 7-9.

The second embodiment of the present disclosure is different from the first embodiment mainly in the guide assembly. The differences between the second embodiment and the first embodiment will be mainly described below, and the undescribed parts can be found in the first embodiment.

Figure 7:
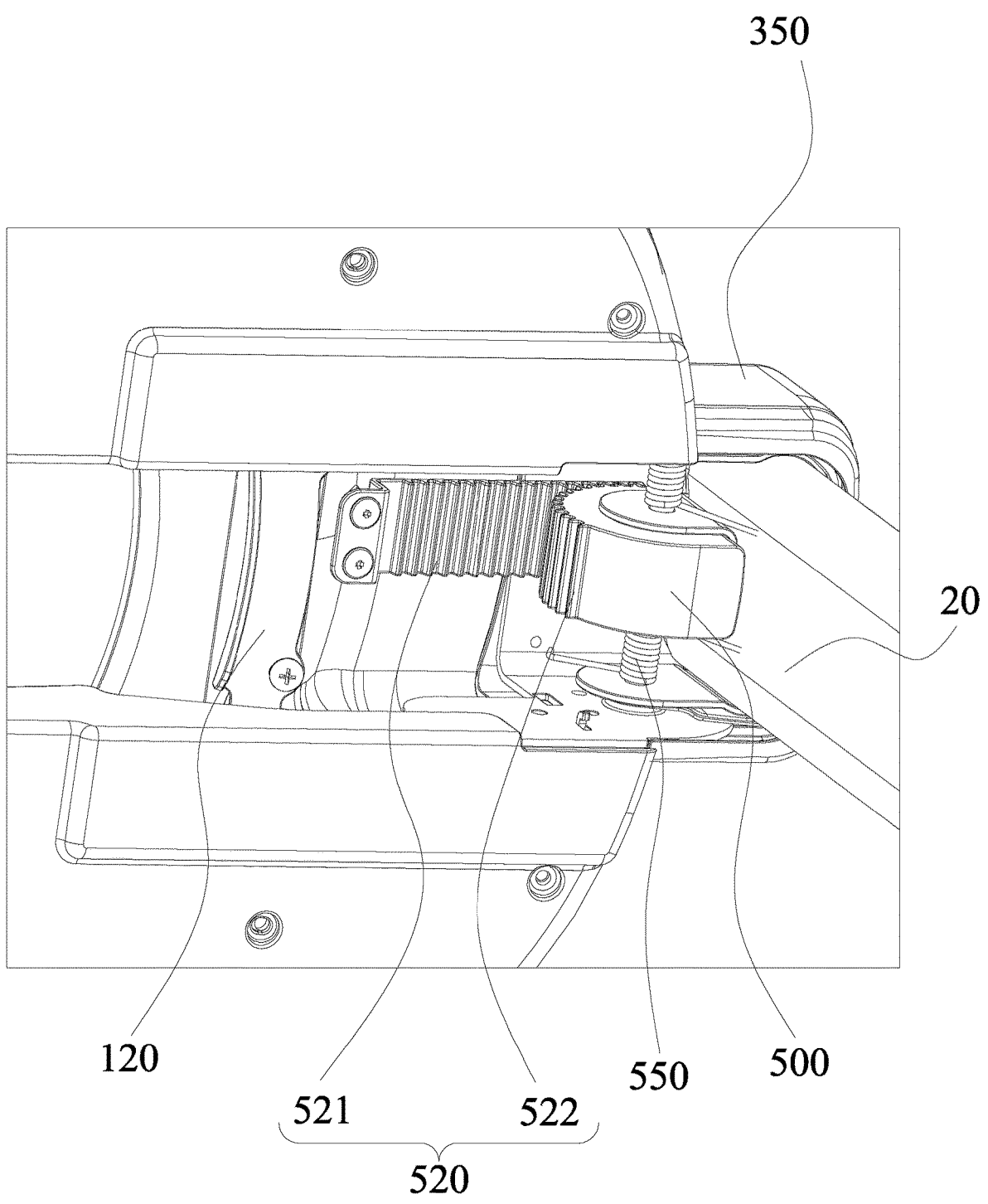
FIG. 7 is a partial perspective view of the base assembly according to a second embodiment of the present disclosure, in which the supporting leg of the base assembly is in an unfolded position.

As shown in FIGS. 7-9, the guide assembly of the second embodiment may include a traction rack 521 and transmission gear 522 engaged with each other. The traction rack 521 may be provided on the base 10 along a direction in which the sliding bracket 340 slides with respect to the base bracket 160. Specifically, the traction rack 521 may be centrally arranged at the bottom of the base 10 and arranged in the front-back direction of the base 10. The traction rack 521 may be fixed to the base 10 by screws, for example. The transmission gear 522 may be formed on the outer circumferential surface of the driving element 500 to constitute at least a part of the arc-shaped outer circumferential surface of the driving element 500. The transmission gear 522 and the traction rack 521 may be kept in an engagement state and have lengths corresponding to each other. The lengths may be equal to or greater than a distance traveled by the transmission gear 522 on the traction rack 521 when the supporting leg 20 moves from the unfolded position to the folded position.

When the supporting leg 20 is pivoted from the unfolded position to the folded position, the supporting leg 20 will drive the driving element 500 to rotate when it is folded. As the transmission gear 522 are engaged with the traction rack 521, when the driving element 500 is rotated, the gear on the traction rack 521 will generate an inward reaction force, thereby driving the driving element 500 to move toward the inside of the base 10. As the driving element 500 is connected with the supporting leg 20, the supporting leg 20 is driven to move toward the inside of the base 10.

It can be understood that during the pivoting of the supporting leg 20 from the folded position to the unfolded position, the above-mentioned processes happen reversely.

This embodiment has stable structure, good running feeling, low running resistance and long service life.

A third embodiment of the present disclosure will be described below mainly with reference to FIGS. 10-14.

The third embodiment of the present disclosure is different from the first embodiment mainly in the guide assembly. The differences between the third embodiment and the first embodiment will be mainly described below, and the undescribed parts can be found in the first embodiment.

As shown in FIGS. 10-14, the guide assembly of the third embodiment may include a traction rod 531. One end of the traction rod 531 may be pivotably connected to the base bracket 160. The other end of the traction rod 531 may be pivotably connected to the driving element 500.

Figure 12:
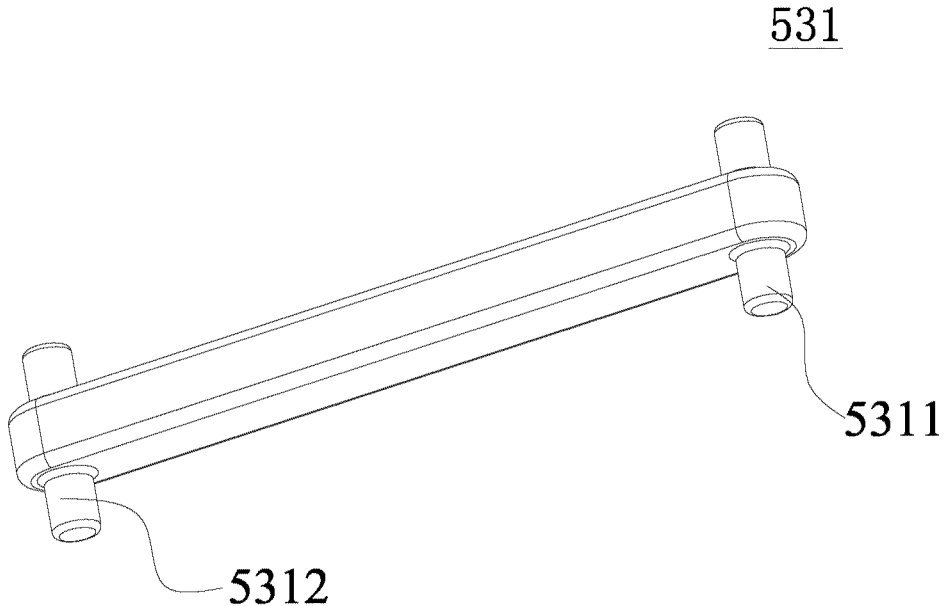
FIG. 12 is a perspective view of a traction rod of the base assembly according to the third embodiment of the present disclosure.
Figure 13:
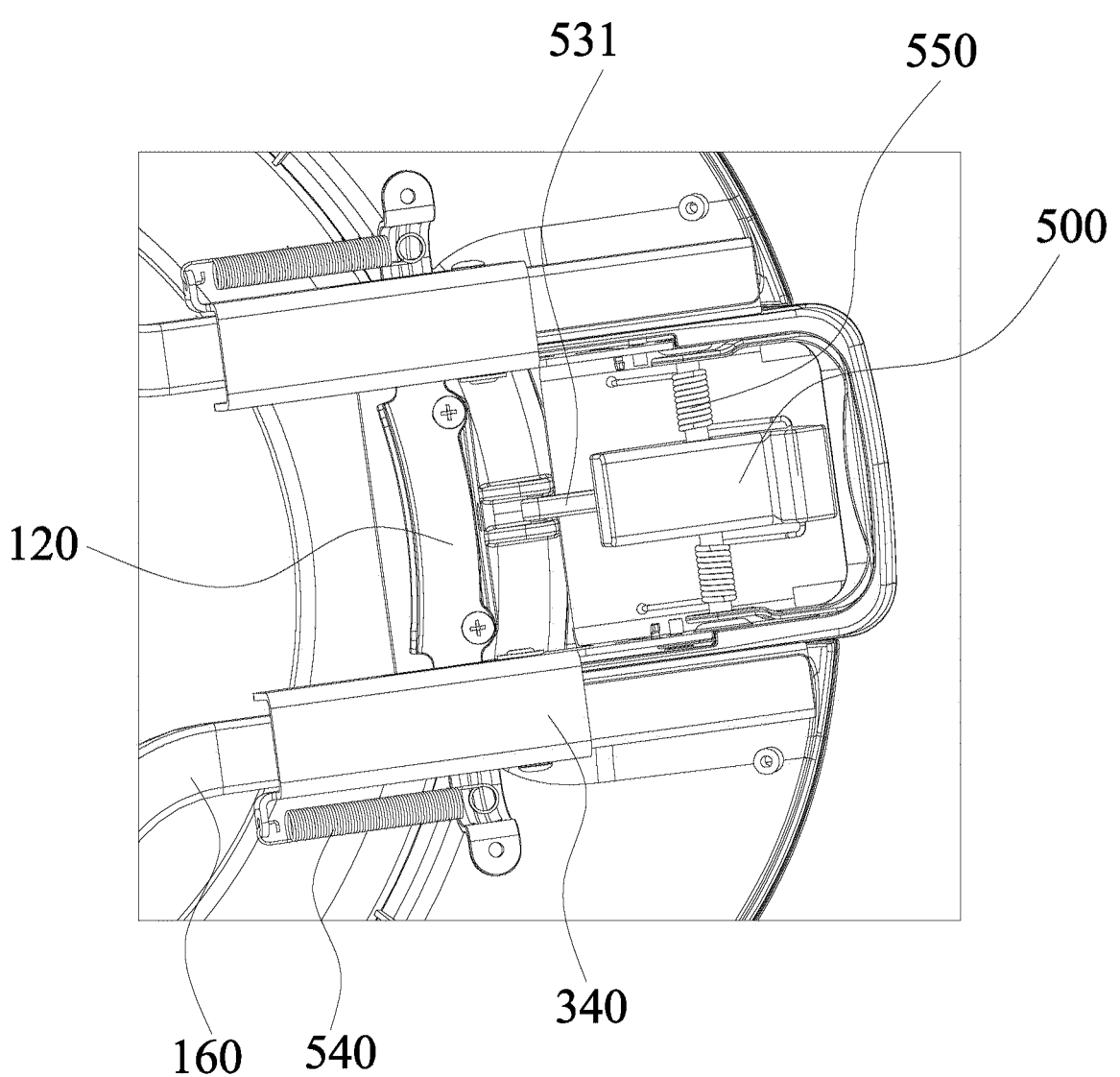
FIG. 13 is a partial perspective view of the base assembly according to the third embodiment of the present disclosure, in which the supporting leg of the base assembly is in a folded position.

As shown in FIG. 12, the traction rod 531 may include a first rotating shaft 5311 and a second rotating shaft 5312 respectively arranged at both ends of the traction rod 531, so that the traction rod 531 may be pivoted about either end.

Figure 10:
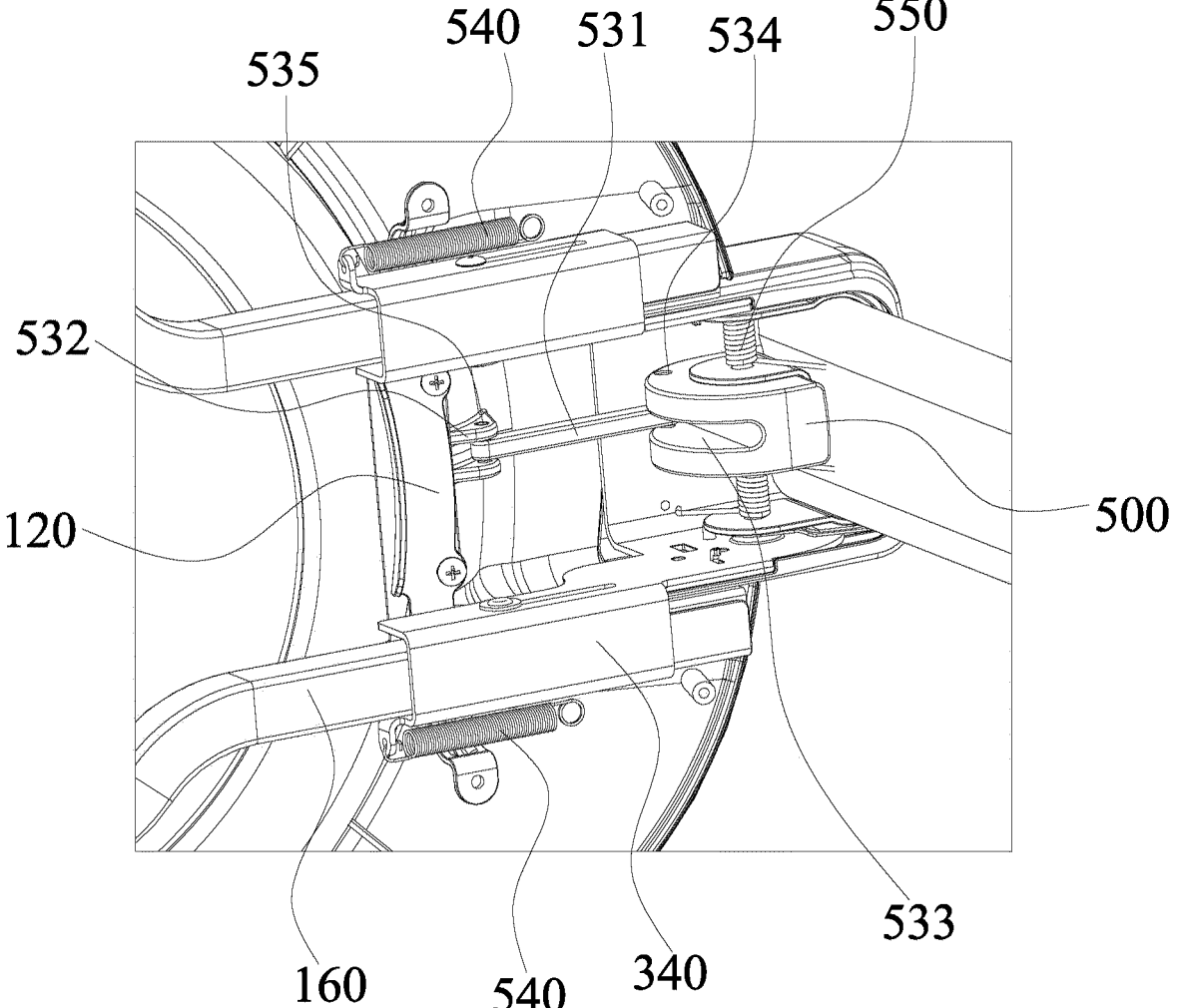
FIG. 10 is a partial perspective view of the base assembly according to a third embodiment of the present disclosure, in which the supporting leg of the base assembly is in an unfolded position.

As shown in FIG. 10, the fixing frame 120 may be provided with a mounting lug 532. An avoidance groove 533 may be formed on the outer circumferential surface of the driving element 500. A first rotating hole 534 may be formed inside the avoidance groove 533. The first rotating hole 534 is located at an outer edge of the driving element 500, that is, eccentrically arranged. A second rotating hole 535 may be formed on the mounting lug 532. The other end of the traction rod 531 may be located inside the avoidance groove 533. The first rotating shaft 5311 and the second rotating shaft 5312 are pivotably connected to the first rotating hole 534 and the second rotating hole 535, respectively. The avoidance groove 533 may be formed so that the driving element 500 will not interfere with the traction rod 531 when the supporting leg 20 is in the unfolded position and the folded position.

Figure 11:
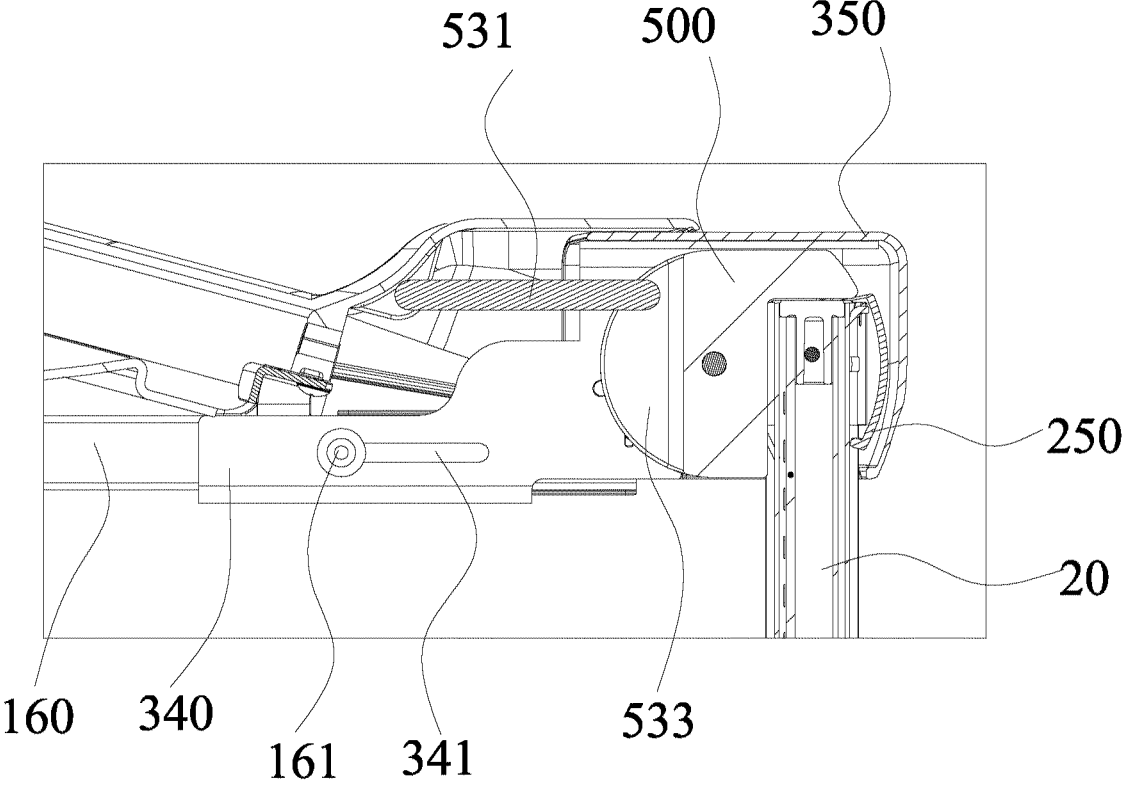
FIG. 11 is a schematic partial cross-sectional view of the base assembly according to the third embodiment of the present disclosure, in which the supporting leg of the base assembly is in the unfolded position.
Figure 14:
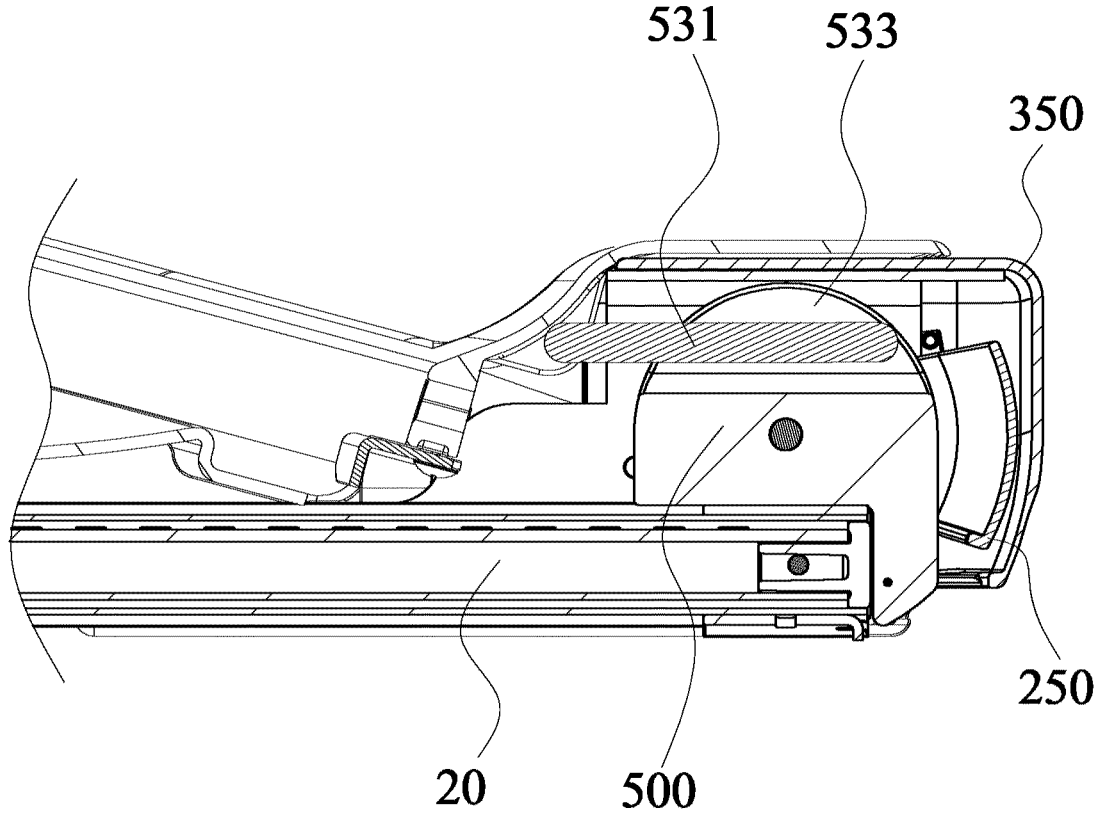
FIG. 14 is a schematic partial cross-sectional view of the base assembly according to the third embodiment of the present disclosure, in which the supporting leg of the base assembly is in the folded position.

Referring to FIGS. 11 and 14, during the pivoting of the supporting leg 20 from the unfolded position to the folded position, the supporting leg 20 is pivoted together with the driving element 500, thereby driving one end of the traction rod 531 to move in an arc shape around the outer circumferential surface of the driving element 500. Since the other end of the traction rod 531 is fixed to the base bracket 160 via the mounting lug 532, the pivoting of the driving element 500 causes the sliding element 30 and the supporting leg 20 to move together toward the inside of the base 10. It can be understood that since the sliding element 30 is sleeved on the base bracket 160 via the sliding bracket 340, the sliding element 30 and the supporting leg 20 may only move along the base bracket 160.

It can be understood that during the pivoting of the supporting leg 20 from the folded position to the unfolded position, the above-mentioned processes happen reversely.

In one embodiment, the base includes a base bracket, and the sliding element includes a sliding bracket, the sliding bracket is sleeved on the base bracket and is able to slide a certain distance with respect to the base bracket.

In one embodiment, the supporting leg retractable structure includes a driving element and a guide assembly, the driving element is arranged inside the sliding element and pivots together with the supporting leg, and the guide assembly converts pivoting of the driving element into an actuating force that moves the sliding element and the supporting leg together toward inside of the base.

In one embodiment, the guide assembly includes a traction element and a rotatable linkage, the traction element transmits movement of one end of the traction element to the other end of the traction element, the rotatable linkage is pivotably connected to the base, one end of the rotatable linkage is connected to the other end of the traction element, and the other end of the rotatable linkage is connected to the sliding bracket.

In one embodiment, the traction element includes a wire and a jacket, the jacket is fixed to the base and is flexible, the wire is arranged inside the jacket, and both ends of the wire are respectively extended out of the jacket so as to be connected to one end of the rotatable linkage and the supporting leg respectively.

In one embodiment, the guide assembly includes a traction rack and transmission gear. The traction rack and transmission gear engaged with each other. The traction rack is arranged on the base along a sliding direction of the sliding bracket with respect to the base bracket, and the transmission gear are formed on an outer circumferential surface of the driving element.

In one embodiment, the guide assembly includes a traction rod, one end of the traction rod is pivotably connected to the base bracket, and the other end of the traction rod is pivotably connected to the driving element.

In one embodiment, an avoidance groove is formed on an outer circumferential surface of the driving element, and the other end of the traction rod is located inside the avoidance groove.

In one embodiment, the base assembly also includes a protective cover, which is coaxially arranged with the driving element to shield a gap between the supporting leg and a housing of the sliding element when the supporting leg is pivoted to the folded position.

In one embodiment, the base assembly also includes a first restoring element for moving the sliding element toward outside of the base, and a second restoring element for pivoting the supporting leg from the folded position to the unfolded position.

In one embodiment, an outer circumferential surface of the driving element is at least partially formed into an arc shape.

This embodiment has a simple structure, few parts, low cost and good running quality.

With the technical solutions as mentioned above, the present disclosure has at least one of the following advantages:

1. In this application, the supporting leg is provided to have at least an unfolded position and a folded position, so that when the child safety seat is used, the supporting leg supports the child safety seat well to prevent the child safety seat from being overturned, and when not in use, the supporting leg may be folded at a bottom of the base to accommodate the supporting leg conveniently, and also reduce the volume of the child safety seat to reduce the transportation cost. Further, the sliding element is telescopically arranged on the base, and the supporting leg is pivotably connected to the sliding element and extended and retracted along with the sliding element, not only enabling the supporting leg to be conveniently installed, but also realizing well pivoting. In addition, the supporting leg may also be extended or retracted with extending or retracting of the sliding element, so that when the supporting leg is not in use, the sliding element may retract into the bottom of the base to reduce a length of the sliding element protruding from the front end of the base or enable the sliding element to not protrude from the base, thereby not affecting children from releasing their feet and improving the riding experience of children, further reducing the volume of the child safety seat and further reducing the transportation cost. In addition, when the supporting leg is pivoted and folded, the guide assembly may provide an inward reaction force, so that the supporting leg is synchronously retracted inward, that is, in a direction close to the base, and it is not necessary for the user to push the supporting leg to retract after folding the supporting leg to achieve complete folding, simplifying the operation of the user, and thus having simple operation and a good user experience, and further having high satisfaction, forming differentiation from the existing products, and greatly improving the market competitiveness of the products.

2. Since the sliding bracket may slide a certain distance with respect to the base bracket, the safety seat may be retracted to a smaller size along a front-back direction when not in use, and extended to a required length along the front-back direction when in use. The sliding bracket is sleeved on the base bracket, and the sliding bracket may stably linearly move with respect to the base bracket, so that the sliding element has a good running feeling.

3. Since the driving element and the guide assembly are provided, the pivoting of the supporting leg may be linked with the translation of the sliding element, and the guide assembly may enable the pivoting of the supporting leg to be transmitted to the sliding element by enlarging the stroke, that is, the supporting leg is rotated with a small angle, realizing a larger retraction of the sliding element and the supporting leg.

4. The child safety seat of the present disclosure is provided with a sliding element and the supporting leg is pivotably connected to the sliding element, so that the supporting leg may be unfolded and folded along with extending and retracting of the sliding element, so that the safety seat may have good safety when unfolded and a small enough size when folded in two use modes. In a first use mode, the seat faces backward and the supporting leg is unfolded, or the seat faces forward and the supporting leg is unfolded; and in a second use mode (i.e., a booster mode), the seat faces forward and the supporting leg is folded. In the first use mode, the seat may be used backward with the supporting leg unfolded or used forward with the supporting leg folded. More specifically, the use mode in which the seat faces backward and the supporting leg is unfolded is suitable for a child younger than 15 months and/or whose height is between 0 and 105 cm; and the use mode in which the seat faces forward and the supporting leg is folded is suitable for a child older than 15 months and/or whose height is between 76 cm and 105 cm, i.e., a "smaller child" mode. In the second use mode (i.e., the booster mode), the seat needs to face forward and the supporting leg need to be folded before use. This mode is suitable for a child whose height is between 100 cm and 150 cm, that is, "a bigger child" mode.

In the first use mode, a grounded position of the supporting leg after it is unfolded may be adjusted through extending and retracting of the sliding element, which can ensure that an upper end of the supporting leg is supported on the base in place, thereby well supporting the safety seat, preventing the safety seat from being overturned, and ensuring the safety of the safety seat when it is used. Meanwhile, there is enough space at a rear row of a vehicle seat, so that when the vehicle is hit, due to sufficient front and rear space, a good buffering effect can be formed to well protect the smaller child; and the large space is convenient to install the safety seat, and also convenient to putting the smaller child in and taking him/her out. Moreover, in the second use mode, that is, when the supporting leg is not needed, the supporting leg may be folded and hidden under the base, and then installed on the vehicle seat for the bigger child to use. Since the bigger child is usually taller than the smaller child, and thus needs more space, the present disclosure not only increases the space of the rear vehicle seat to meet the riding space of the bigger child, but also forms better buffering when the vehicle is hit due to large front and rear spaces, providing better safety protection to the bigger child, providing a space for the bigger child to put their feet, improving the comfort of riding the safety seat, and ensuring the safety and stability of the bigger child. Also, when not in use, the supporting leg is stored and hidden, reducing the overall size of the safety seat, reducing the packaging volume of the safety seat, and thus reducing the transportation cost. In addition, with extending/retracting and folding of the sliding element, that is, the supporting leg, the overall size of the safety seat can be changed. The size of the rear row space is different due to different types of vehicles, the present disclosure may be applied to different types of vehicles, greatly improving the application range of the safety seat. Further, the safety seat may be used in two modes, that is, the use modes for the smaller child and for bigger child (more than one purpose for one seat), greatly improving the application range of the safety seat. In this way; the user may only buy one safety seat, greatly reducing the use cost of the user, providing better attraction to the user, forming product differentiation, and greatly enhancing the market competitiveness of products.

Those skilled in the art will easily think of other embodiments of the present disclosure after considering the specification and practicing the present disclosure as mentioned above. The present disclosure is intended to cover any variations, uses or adaptations of the present disclosure, which follow the general principles of the present disclosure and include common knowledge or common technical means in the technical field that are not disclosed in the present disclosure. Also, the specification and its embodiments are to be regarded as examples only, and the scope and spirit of the present disclosure are indicated by the claims of the present disclosure.

Although the present disclosure has been described with reference to the examples of typical embodiments, the terms used are illustrative and exemplary, rather than restrictive. Since the present disclosure may be embodied in various forms without departing from the spirit and essence of the present disclosure, it should be understood that the above-mentioned embodiments are not limited to any of the foregoing details, but should be interpreted in the broadest sense within the scope defined by the claims, so all changes that fall within the scope of the claims or their equivalents should be covered by the claims.

What is claimed is:

1. A base assembly, comprising:
a base;
a sliding element telescopically arranged on the base,
a supporting leg pivotally connected to the sliding element and extended and retracted along with the sliding element, the supporting leg having an unfolded position when in use and a folded position when not in use; and
a supporting leg retractable structure actuating the sliding element and the supporting leg to move toward an inside of the base in response to pivoting the supporting leg from the unfolded position to the folded,
wherein the base comprises a base bracket, the sliding element comprises a sliding bracket, the sliding bracket is sleeved on the base bracket and is able to slide a certain distance with respect to the base bracket, so that the sliding element is capable of being extended out of the base and at least partially retracted into the base, and
wherein the supporting leg retractable structure comprises a driving element and a guide assembly, the driving element is arranged inside the sliding element and pivots together with the supporting leg, and the guide assembly converts pivoting of the driving element into an actuating force that moves the sliding element and the supporting leg together toward the inside of the base.

2. The base assembly according to claim 1,
wherein the guide assembly comprises a traction element and a rotatable linkage, and
wherein the traction element transmits movement of one end of the traction element to the other end of the traction element, the rotatable linkage is pivotally connected to the base, one end of the rotatable linkage is connected to the other end of the traction element, and the other end of the rotatable linkage is connected to the sliding bracket.

3. The base assembly according to claim 2,
wherein the traction element comprises a wire and a jacket,
wherein the jacket is fixed to the base and is flexible, the wire is arranged inside the jacket, and both ends of the wire are respectively extended out of the jacket so as to be connected to one end of the rotatable linkage and the supporting leg respectively.

4. The base assembly according to claim 1, wherein the guide assembly comprises a traction rack and a transmission gear engaged with each other, the traction rack is arranged on the base along a sliding direction of the sliding bracket with respect to the base bracket, and the transmission gear are formed on an outer circumferential surface of the driving element.

5. The base assembly according to claim 1, wherein the guide assembly comprises a traction rod, one end of the traction rod is pivotally connected to the base bracket, and the other end of the traction rod is pivotally connected to the driving element.

6. The base assembly according to claim 5, wherein a groove is formed on an outer circumferential surface of the driving element, and the other end of the traction rod is located inside the groove.

7. The base assembly according to claim 1, wherein the base assembly further comprises a cover, the cover is coaxially arranged with the driving element to shield a gap between the supporting leg and a housing of the sliding element when the supporting leg is pivoted to the folded position.

8. The base assembly according to claim 1, wherein an outer circumferential surface of the driving element is at least partially formed into an arc shape.

9. The base assembly according to claim 1, wherein the base assembly further comprises a first restoring element for moving the sliding element toward outside of the base, and a second restoring element for pivoting the supporting leg from the folded position to the unfolded position.

10. A child safety seat, comprising:
the base assembly according to claim 1; and
a seat arranged on the base assembly.

* * * * *